(12) United States Patent
Ryon et al.

(10) Patent No.: US 11,898,493 B2
(45) Date of Patent: Feb. 13, 2024

(54) SYSTEMS FOR FUEL INJECTORS WITH FUEL AIR HEAT EXCHANGERS

(71) Applicant: Collins Engine Nozzles, Inc., Des Moines, IA (US)

(72) Inventors: Jason A. Ryon, Carlisle, IA (US); Gregory A. Zink, Des Moines, IA (US); Brandon P. Williams, Johnston, IA (US); Lev A. Prociw, Johnston, IA (US)

(73) Assignee: Collins Engine Nozzles, Inc., Des Moines, IA (US)

( * ) Notice: Subject to any disclaimer, the term of this patent is extended or adjusted under 35 U.S.C. 154(b) by 0 days.

(21) Appl. No.: 18/202,662

(22) Filed: May 26, 2023

(65) Prior Publication Data

US 2023/0296051 A1 Sep. 21, 2023

Related U.S. Application Data

(62) Division of application No. 17/406,767, filed on Aug. 19, 2021.

(51) Int. Cl.
*F02C 7/18* (2006.01)
*F02C 7/224* (2006.01)
(Continued)

(52) U.S. Cl.
CPC .............. *F02C 7/185* (2013.01); *F02C 7/224* (2013.01); *F23R 3/283* (2013.01); *F02C 9/18* (2013.01);
(Continued)

(58) Field of Classification Search
CPC ...................................................... F02C 7/185
See application file for complete search history.

(56) References Cited

U.S. PATENT DOCUMENTS 4,483,137 A 11/1984 Faulkner
5,261,226 A * 11/1993 Pillsbury ................. F02C 3/365
60/39.463

(Continued)

FOREIGN PATENT DOCUMENTS

EP 0030880 B1 8/1983
EP 3828399 A1 6/2021

OTHER PUBLICATIONS

Extended European Search Report dated Jan. 20, 2023, issued during the prosecution of European Patent Application No. EP 22191199.3.

*Primary Examiner* — Katheryn A Malatek
*Assistant Examiner* — Alyson Joan Harrington
(74) *Attorney, Agent, or Firm* — Locke Lord LLP; Joshua L. Jones; Scott D. Wofsy

(57) ABSTRACT

A system includes an air manifold, a fuel manifold, and a plurality of fuel injectors. At least one of the fuel injectors includes a heat exchanger portion for supplying compressed, cooled air form the heat exchanger portion to the air manifold. An air valve is operatively connected to an outlet of the air manifold for controlling release of air from the air manifold. A controller is operatively connected to the air valve, wherein the controller includes machine readable instructions configured to control the air valve to regulate flow of air through the air valve based on fuel temperatures in the fuel channel. The machine readable instructions can be configured to cause the controller to flow air through the air valve in a heat exchange mode if a fuel temperature in the fuel injectors is below a predetermined fuel temperature.

6 Claims, 3 Drawing Sheets

(51) Int. Cl.
*F23R 3/28* (2006.01)
*F02C 9/18* (2006.01)

(52) U.S. Cl.
CPC .. *F05D 2260/213* (2013.01); *F05D 2260/232* (2013.01); *F05D 2270/303* (2013.01)

(56) References Cited

U.S. PATENT DOCUMENTS

| | | |
|---|---|---|
| 9,109,842 B2 | 8/2015 | Prociw et al. |
| 10,400,674 B2 | 9/2019 | Xu |
| 10,830,150 B2 | 11/2020 | Snyder et al. |
| 11,022,037 B2 | 6/2021 | Niergarth et al. |
| 11,029,029 B2 | 6/2021 | Lakshmanan et al. |
| 2005/0000226 A1* | 1/2005 | McCaffrey ............... F23R 3/60 60/752 |
| 2016/0201917 A1 | 7/2016 | Dautova et al. |
| 2016/0273453 A1* | 9/2016 | Frish ....................... F23R 3/283 |
| 2016/0290290 A1 | 10/2016 | Lo |
| 2018/0266691 A1 | 9/2018 | Sweeney et al. |
| 2019/0113233 A1* | 4/2019 | Snyder .................... F23R 3/283 |
| 2019/0277201 A1 | 9/2019 | Veilleux, Jr. et al. |
| 2020/0217510 A1 | 7/2020 | Sampath et al. |
| 2021/0156310 A1 | 5/2021 | Prociw et al. |

\* cited by examiner

SYSTEMS FOR FUEL INJECTORS WITH FUEL AIR HEAT EXCHANGERS

CROSS-REFERENCE TO RELATED APPLICATIONS

This is a divisional of U.S. patent application Ser. No. 17/406,767 filed Aug. 19, 2021 the content of which is incorporated by reference herein in its entirety.

BACKGROUND

1. Field

The present disclosure relates generally to fuel and air systems for gas turbine engines, and more particularly to fuel injectors and fuel air heat exchanger systems for gas turbine engines.

2. Description of Related Art

A portion of the compressor discharge air in a gas turbine engine can be diverted from the main gas flow though the engine for various uses in the engine and onboard an aircraft. However, this air is typically too hot to be of use in general applications. Fuel air heat exchangers can be used to cool the diverted portion of compressed air. However, fuel air heat exchangers are not typically easy to retrofit on existing engine designs and this among other things leaves a need in the art for improved systems and methods for fuel air heat exchange. This disclosure provides a solution for this need.

SUMMARY

A system includes an air manifold, a fuel manifold, and a plurality of fuel injectors. Each fuel injector is connected in fluid communication to receive fuel from the fuel manifold. At least one fuel injector in the plurality of fuel injectors includes a heat exchanger portion wherein an air channel and a fuel channel are in thermal communication with one another for heat exchange between fuel and air passing through the heat exchanger portion. The fuel channel passes from a fuel channel inlet, through the heat exchanger portion to a nozzle outlet. The air channel passes from the heat exchanger portion, to an air channel outlet. The respective inlet of the fuel channel is connected to the fuel manifold for fluid communication of fuel from the fuel manifold to the nozzle outlet for combustion. The respective outlet of the air channel is connected to the air manifold for fluid communication of air from the heat exchanger portion into the air manifold.

An air valve is operatively connected to an outlet of the air manifold for controlling release of air from the air manifold. A controller is operatively connected to the air valve, wherein the controller includes machine readable instructions configured to control the air valve to regulate flow of air through the air valve based on fuel temperatures in the fuel channel. The machine readable instructions can be configured to cause the controller to flow air through the air valve in a heat exchange mode if a fuel temperature in the fuel injectors is below a predetermined fuel temperature.

The machine readable instructions can be configured to cause the controller to vary air flow rate through the air valve in the heat exchange mode to increase air flow through the air valve while maintaining fuel temperature below the predetermined limit. A temperature sensor can be mounted in at least one of the fuel injectors operative to produce a signal indicative of fuel temperature in the fuel channels of the fuel injectors. The controller can be operatively connected to receive the signal, wherein the machine readable instructions are configured to control the air flow rate based on the signal. The machine readable instructions can be configured to cause the controller to prevent air flow through the air valve in a neutral mode.

An auxiliary source of conditioned, compressed air can be included, selectively in fluid communication with the air manifold. The machine readable instructions can be configured to prevent air flow out of the air manifold and instead flow air from the auxiliary source into the air manifold in a fuel cooling mode. The auxiliary source of air can include an air cooling heat exchanger separate from the fuel injectors and operative to cool compressor discharge air. A boost compressor can be connected in fluid communication with the air cooling heat exchanger and operative to raise pressure in a flow of air from the air cooling heat exchanger above compressor discharge air pressure. The boost compressor can be in fluid communication with the air valve. The air valve can be configured to block flow out of the air manifold and admit air into the air manifold from the boost compressor for active cooling of fuel in the at least one fuel injector in the plurality of fuel injectors in the fuel cooling mode. The controller can be configured to initiate the fuel cooling mode based on a signal received from at least one temperature sensor in the plurality of fuel injectors.

The system can include an engine case. The heat exchanger portion of the at least one fuel injector in the plurality of fuel injectors can be inside the engine case. The air manifold and fuel manifold can be outside the engine case. The air manifold and the fuel manifold can be spaced apart from one another, with a gap between the air manifold and the fuel manifold. A combustor dome wall can be included inside the engine case. A combustion space of a combustor can be defined on a downstream side of the combustor dome wall. Each fuel injector in the plurality of fuel injectors can include a nozzle outlet mounted proximate to and in fluid communication through the combustor dome wall operative to issue fuel into the combustion space. An inlet to the air channel of the at least one fuel injector in the plurality of fuel injectors can be located on an upstream side of the combustor dome wall opposite the combustion space.

A method of heat exchange for a gas turbine engine includes collecting air from a respective fuel air heat exchanger portion of at least one fuel injector in a plurality of fuel injectors into an air manifold. The method includes supplying air from the air manifold to one or more external compressed air systems in a heat exchange mode.

The method can include varying flow of air through the air manifold based on fuel temperature in the plurality of fuel injectors. Modulating flow of air can include increasing flow of air through the manifold if fuel temperature in the plurality of fuel injectors permits without exceeding a predetermined limit on fuel temperature.

The method can include preventing air flow through the air manifold in a neutral mode. In a fuel cooling mode, the method can include preventing air flow out of the air manifold and instead flowing air into the air manifold. In the fuel cooling mode, cooling air from the air manifold can be flowed into the plurality of fuel injectors. The method can include supplying cooling air to the air manifold from compressor discharge air that is pressure boosted to above compressor discharge air pressure. The method can include cooling pressure boosted, compressor discharge air upstream of the air manifold in the fuel cooling mode.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
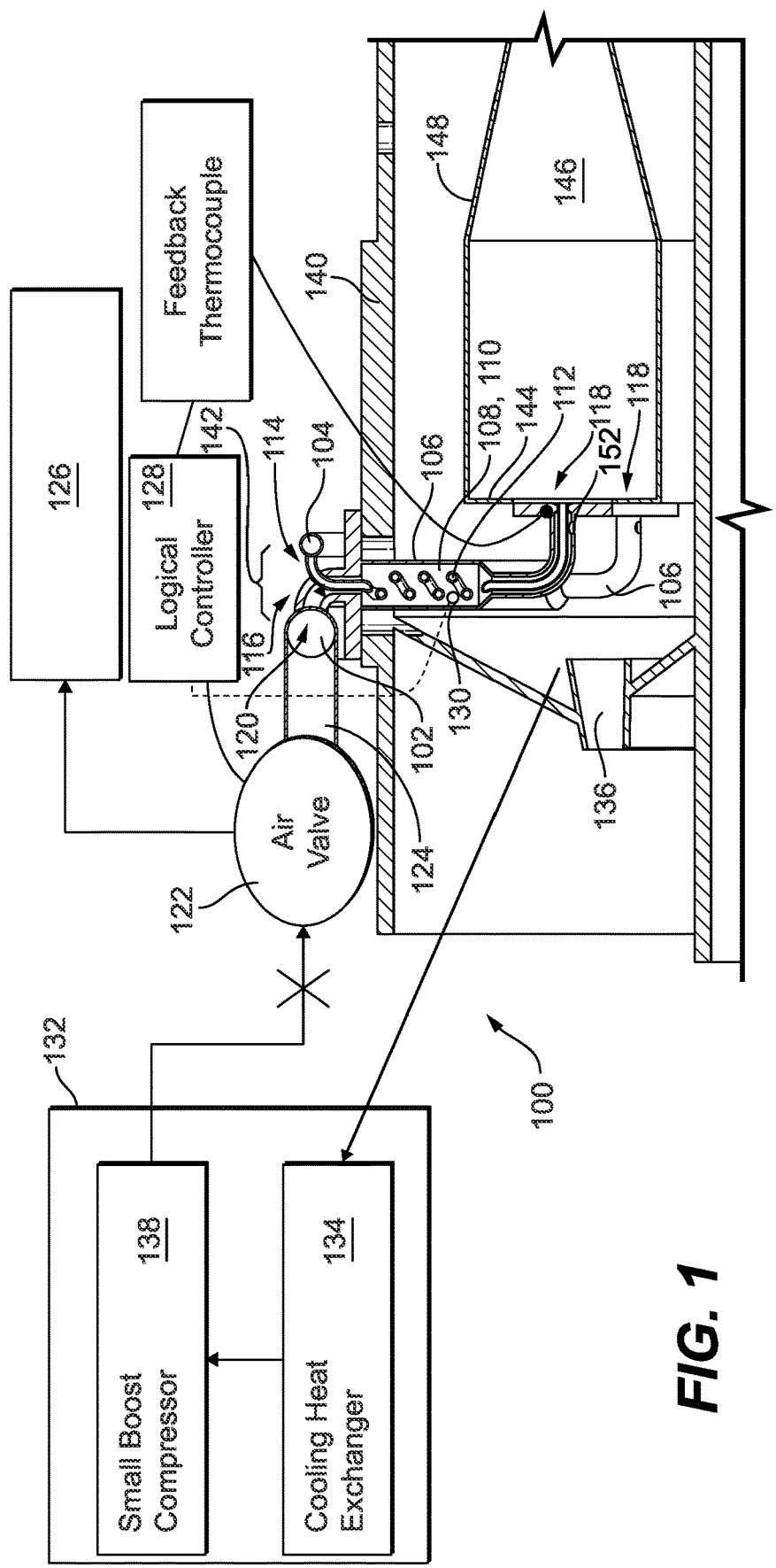
FIGS. 1-3 are schematic cross-sectional views of an embodiment of a system constructed in accordance with the present disclosure, showing fuel and air manifolds for a set of fuel injectors with an integrated fuel air heat exchangers extending into the engine case, showing the system in an air cooling mode, a neutral mode, and a fuel cooling mode, respectively.

Reference will now be made to the drawings wherein like reference numerals identify similar structural features or aspects of the subject disclosure. For purposes of explanation and illustration, and not limitation, a partial view of an embodiment of a fuel injector in accordance with the disclosure is shown in FIG. 1 and is designated generally by reference character 100. Other embodiments of systems in accordance with the disclosure, or aspects thereof, are provided in FIGS. 2-3, as will be described. The systems and methods described herein can be used to provide a supply of cool, compressed air from compressor discharge air for use on an engine and/or aircraft, using heat exchangers in the fuel injectors, as well as techniques for cooling fuel in the fuel injectors.

The system 100 includes an air manifold 102, a fuel manifold 104, and a plurality of fuel injectors 106. Only two fuel injectors 106 are shown in the upper, annular cross-section of FIGS. 1-3, however those skilled in the art will readily appreciate that any suitable number of fuel injectors can be arranged around the annular engine axis. Each fuel injector 106 is connected in fluid communication to receive fuel from the fuel manifold 104. At least one of the fuel injectors 106 includes a heat exchanger portion 108 wherein an air channel 110 and a fuel channel 112 are in thermal communication with one another for heat exchange between fuel and air passing through the heat exchanger portion 108. While only one injector 106 needs to include a heat exchanger portion 108, any number of the fuel injectors 106, including all of them, can include a respective heat exchanger portion 108. The fuel channel 112 passes from a fuel channel inlet 114, through a fixture portion 116 of the fuel injector and through the heat exchanger portion 108 to the nozzle outlet 118. The air channel 110 passes from the heat exchanger portion 108, through the fixture portion 116, to an air channel outlet 120. The respective inlet 114 of the fuel channel 112 is connected to the fuel manifold 104 for fluid communication of fuel from the fuel manifold 104 to the nozzle outlet 118 for combustion. The respective outlet 120 of the air channel 110 is connected to the air manifold 102 for fluid communication of air from the heat exchanger portion 108 into the air manifold 102.

An air valve 122 is operatively connected to an outlet 124 of the air manifold 102 for controlling release of air from the air manifold 102, e.g. for use as cooling or just compressed air in aircraft or engine systems 126. A controller 128 is operatively connected to the air valve 122. The controller 128 includes machine readable instructions configured to control the air valve 122 to regulate flow of air through the air valve 122 based on fuel temperatures in the fuel channel 112. The machine readable instructions are configured to cause the controller 128 to flow air through the air valve 122 in a heat exchange mode, as shown in FIG. 1, if a fuel temperature in the fuel injectors 106 is below a predetermined fuel temperature, e.g. to avoid over heating the fuel in the fuel channel 112.

With continued reference to FIG. 1, the machine readable instructions are configured to cause the controller 128 to vary air flow rate through the air valve 122 in the heat exchange mode to increase air flow through the air valve 122 to the systems 126 while maintaining fuel temperature below the predetermined limit. A temperature sensor 130 can be mounted in at least one of the fuel injectors 106 operative to produce a signal indicative of fuel temperature in the fuel channels 112 of the fuel injectors 106, especially in the fuel injector or injectors 106 that include heat exchanger portions 108. The controller 128 is operatively connected to receive the signal, wherein the machine readable instructions are configured to control the air flow rate through the air valve 122 based on the signal. For best control, the temperature sensor 130 should be located as near as possible to the outlet of the fuel channel 112, e.g. in the nozzle tip. This is where the fuel temperatures will be highest and best not to exceed. However, locating the temperature sensor 130 in other locations such in the heat exchanger portion 108 as shown in FIG. 1, the temperature at the tip can be inferred based on fuel flow rates and heat transfer rates.

There is another way to control this system without a direct sensor 130. That is the controller 128 can just know the operational point of the injectors 106, such as by using a pre-programmed digital model of heat transfer analysis considering the engine operating conditions, which may be used to self-diagnose the required flow and directions. For example, if the controller 128 knows the engine is at a takeoff condition, it knows the incoming air is hot, but also has a lot of fuel, so maybe it may be still acceptable to operate in the mode of FIG. 1. While on a slam deceleration, the air may still be hot, but fuel flow rate is slowed down, thus overheating could occur if heat exchange in the injectors 106 is active, so one of the modes below may be used in that engine state. There are also mission dependent operations where it may be desirable to override the temperature limit. For example, the pilot or platform needs to temporarily exceed the temperature limits, but for a short period of time if that exceedance is acceptable to the system. An example would be for providing cooling for a laser for a short duration.

If the fuel temperature is low enough to be able to absorb more heat, and compressor air is also not yet too hot, the fuel can exchange heat with the air. This cooled air can then be used to cool or just pressurize external components 126. The air valve 122 can be used to control the air flow rate to not overheat the fuel, while also potentially maximizing cooling based on feedback from the temperature sensor 130.

Figure 2:
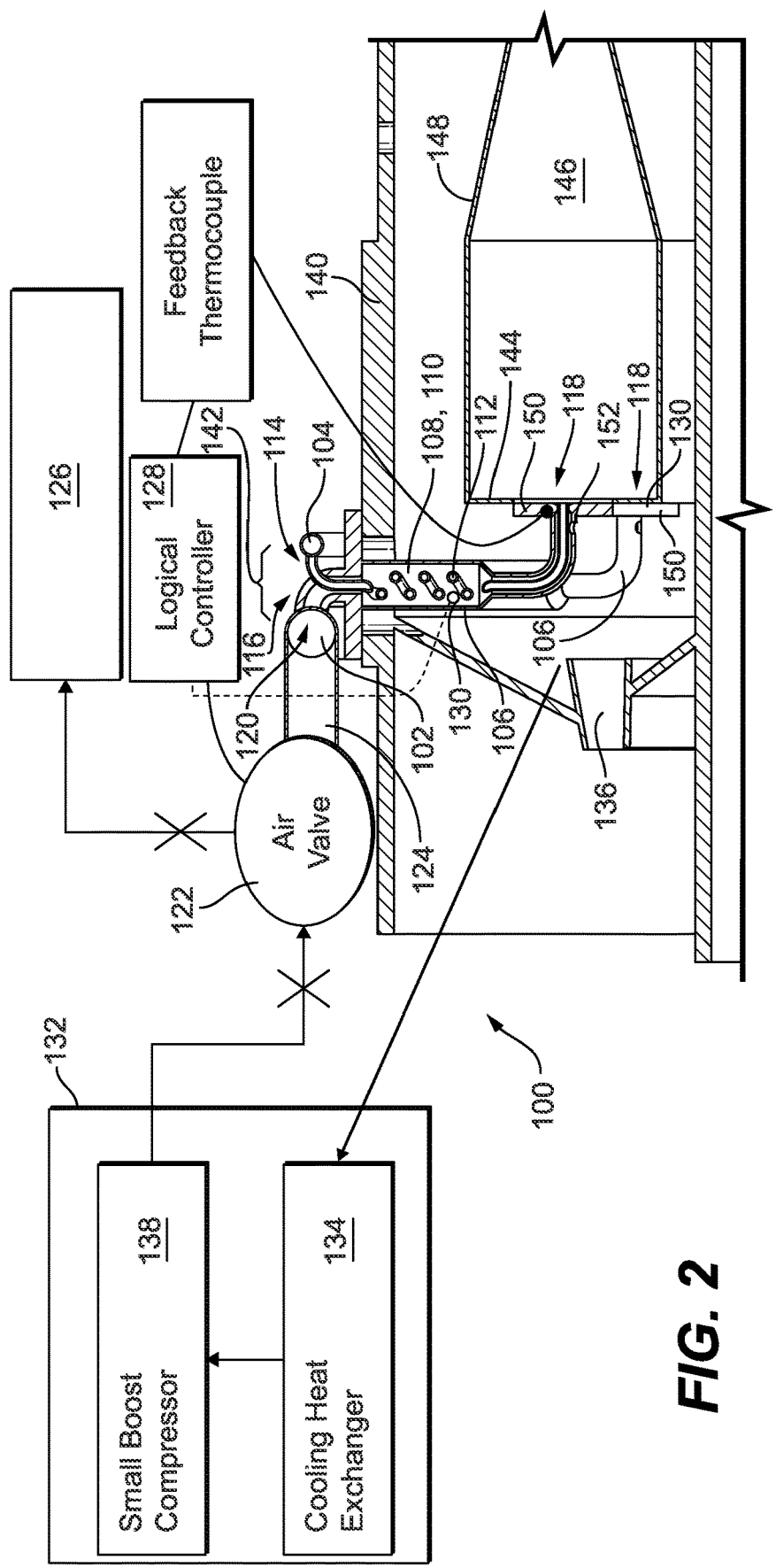

With reference now to FIG. 2, the machine readable instructions are configured to cause the controller to prevent air flow through the air valve 102 in a neutral mode. The neutral mode can be useful if the compressor discharge air temperatures are too high, and/or the fuel temperatures in the fuel channel 112 is too high. In the neutral mode, air gaps in the fuel injectors 106 can insulate fuel in the fuel injectors 106 from the compressor discharge air outside the fuel injectors 106. In particular, for any of the fuel injectors 106 that include a heat exchanger portion 108, the air channel 110 with stagnant air therein can serve as an insulation gap for the respective fuel channel 112. If fuel cooling mode (as described below) is not needed for engine operation, the neutral mode can be used rather than active cooling.

Figure 3:
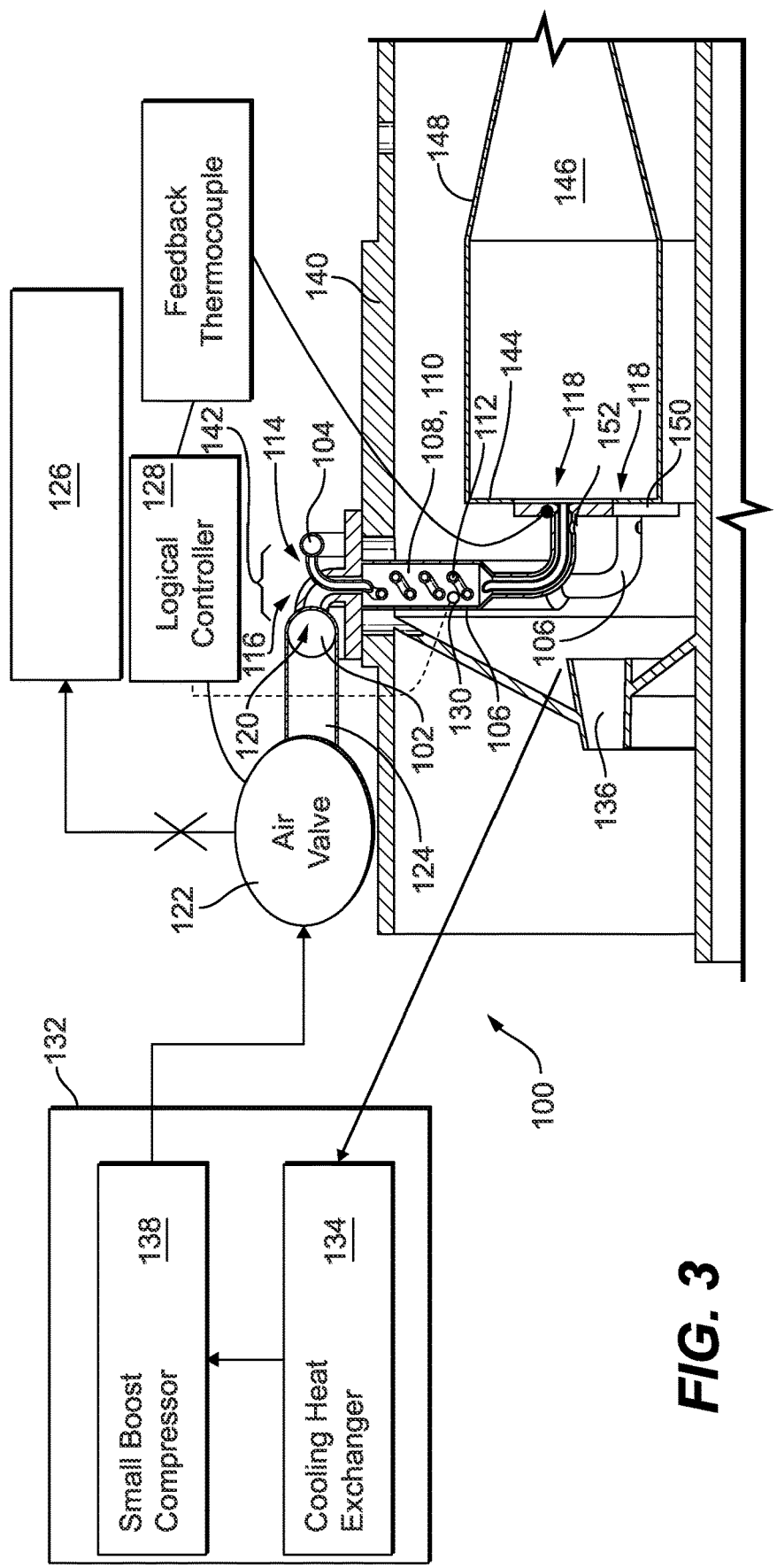

Referring now to FIG. 3, there is also an optional fuel cooling mode. An auxiliary source 132 of conditioned, compressed air is included, selectively in fluid communication with the air manifold 122. The machine readable instructions are configured to prevent air flow out of the air manifold 102 and instead flow air from the auxiliary source 132 into the air manifold 102 and heat exchanger portion(s) 108 in a fuel cooling mode. The auxiliary source 132 of air includes an air cooling heat exchanger 134 separate from the fuel injectors 106 and operative to cool compressor discharge air from the compressor (the diffuser 136 is shown in FIGS. 1-3). A boost compressor 138 is connected in fluid communication with the air cooling heat exchanger 134 and operative to raise pressure in a flow of air from the air cooling heat exchanger 134 to a pressure above the compressor discharge air pressure. The boost compressor 134 is in fluid communication with the air valve 122 (or a separate air valve of the air manifold 102 in addition to the air valve 122). The air valve 122 is configured to block flow out of the air manifold 102 and admit air into the air manifold 102 from the boost compressor 138 for active cooling of fuel in the at least one fuel injector 106 with a heat exchanger portion 108 in the fuel cooling mode. The controller 128 is configured to initiate the fuel cooling mode based on a signal received from at least one temperature sensor 130 in the plurality of fuel injectors 106.

If the fuel temperature is already hot, and the compressor discharge air is also very hot, it may be advantageous to actively cool the fuel injectors 106. This can be done by running the air circuit in reverse to cool off the fuel in the fuel injectors 106. The amount of air needed can be determined and controlled using the air valve 122 and temperature sensor 130 for feedback.

With reference again to FIG. 1, the system 100 includes an engine case 140. The heat exchanger portion 108 of the at least one fuel injector 106 in the plurality of fuel injectors 106 is inside the engine case 140. The air manifold 102 and fuel manifold 104 are outside the engine case 140. The air manifold 102 and the fuel manifold 104 are spaced apart from one another, with a gap 142 between the air manifold 102 and the fuel manifold 104. A combustor dome wall 144 is included inside the engine case. A combustion space 146 of a combustor 148 is defined on a downstream side of the combustor dome wall 144. Each fuel injector 106 in the plurality of fuel injectors includes a nozzle outlet 150 mounted proximate to and in fluid communication through the combustor dome wall 144 operative to issue fuel into the combustion space 146. An inlet 152 to the air channel 110 of heat exchanger portion(s) 108 is located upstream of the compressor side of the combustor dome wall 144 opposite the combustion space 146.

A method of heat exchange for a gas turbine engine includes collecting air from a respective fuel air heat exchanger portion (e.g. heat exchanger portion 108) of at least one fuel injector in a plurality of fuel injectors (e.g. fuel injectors 106) into an air manifold (e.g. air manifold 102). The method includes supplying air from the air manifold to one or more external compressed air systems (e.g., systems 126) in a heat exchange mode, as shown in FIG. 1.

The method includes varying flow of air through the air manifold based on fuel temperature in the plurality of fuel injectors. Modulating flow of air includes increasing flow of air through the manifold if fuel temperature in the plurality of fuel injectors permits without exceeding a predetermined limit on fuel temperature.

The method can include preventing air flow through the air manifold in a neutral mode, as shown in FIG. 2. In a fuel cooling mode, as shown in FIG. 3, the method can include preventing air flow out of the air manifold and instead flowing air into the air manifold. In the cooling mode, cooling air from the air manifold is flowed into the plurality of fuel injectors. The method includes supplying cooling air to the air manifold from compressor discharge air that is pressure boosted to above compressor discharge air pressure. The method includes cooling pressure boosted, compressor discharge air upstream of the air manifold in the fuel cooling mode, e.g. using boost compressor 138 and cooling heat exchanger 134.

Potential benefits include a high pressure, cooled air stream available for cooling other parts of the engine or airplane. This arrangement potentially allows the maximum amount of heat to be extracted from the high pressure/high temperature compressed air without excessive fuel temperatures. Active temperature control provides prevention of overheating fuel which may include the operation of the air valve and also temperature feedback from within one or more fuel injectors. Reverse operation, e.g. in the fuel cooling mode, can enable the heat exchanger to be used to cool the fuel injectors with cold incoming air, as well as an air assist to provide additional fuel atomization, for example at engine startup or altitude relight.

As will be appreciated by those skilled in the art, aspects of the present disclosure may be embodied as a system, method or computer program product. Accordingly, aspects of this disclosure may take the form of an entirely hardware embodiment, an entirely software embodiment (including firmware, resident software, micro-code, etc.), or an embodiment combining software and hardware aspects, all possibilities of which can be referred to herein as a "circuit," "module," or "system." A "circuit," "module," or "system" can include one or more portions of one or more separate physical hardware and/or software components that can together perform the disclosed function of the "circuit," "module," or "system", or a "circuit," "module," or "system" can be a single self-contained unit (e.g., of hardware and/or software). Furthermore, aspects of this disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of this disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of this disclosure may be described above with reference to flowchart illustrations and/or block diagrams of methods, apparatus (systems) and computer program products according to embodiments of this disclosure. It will be understood that each block of any flowchart illustrations and/or block diagrams, and combinations of blocks in any flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in any flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified herein.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

The articles "a", "an", and "the" as used herein and in the appended claims are used herein to refer to one or to more than one (i.e., to at least one) of the grammatical object of the article unless the context clearly indicates otherwise. By way of example, "an element" means one element or more than one element.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of."

Any suitable combination(s) of any disclosed embodiments and/or any suitable portion(s) thereof are contemplated herein as appreciated by those having ordinary skill in the art in view of this disclosure.

The methods and systems of the present disclosure, as described above and shown in the drawings, provide for a supply of cool, compressed air from compressor discharge air for use on an engine and/or aircraft, using heat exchangers in the fuel injectors, as well as techniques for cooling fuel in the fuel injectors. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A method of heat exchange for a gas turbine engine comprising:
   a fuel heating mode comprising:
      collecting air cooled by fuel from a fuel air heat exchanger portion of at least one fuel injector in a plurality of fuel injectors into an air manifold; and
      supplying the air cooled by the fuel from the air manifold to one or more external compressed air systems;
   and
   a fuel cooling mode comprising:
      preventing air flow out of the air manifold to the one or more external compressed air systems;
      flowing cooling air into the air manifold; and
      flowing the cooling air into the respective fuel air heat exchanger portion of the at least one fuel injector in a plurality of fuel injectors.

2. The method as recited in claim 1, further comprising varying a flow of the air cooled by the fuel or a flow of the cooling air through the air manifold based on a fuel temperature in the plurality of fuel injectors.

3. The method as recited in claim 2, wherein
   in the fuel heating mode:
      the varying of the flow of the air cooled by the fuel includes increasing the flow of the air cooled by the fuel through the air manifold if the fuel temperature in the plurality of fuel injectors permits without exceeding a predetermined limit on the fuel temperature.

4. The method as recited in claim 2, further comprising preventing the flow of the air cooled by the fuel or the flow of the cooling air through the air manifold in a neutral mode.

5. The method as recited in claim 1, further comprising
   in the fuel cooling mode:
      supplying the cooling air to the air manifold from compressor discharge air that is pressure boosted to above compressor discharge air pressure.

6. The method as recited in claim 5, further comprising
   in the fuel cooling mode:
      cooling the compressor discharge air prior to pressure boosting the compressor discharge air upstream of the air manifold.

* * * * *